(12) United States Patent
Riggle

(10) Patent No.: US 7,630,288 B2
(45) Date of Patent: Dec. 8, 2009

(54) PHONOGRAPH TONE ARM MOUNTING, DECOUPLING, VERTICAL TRACKING ANGLE ADJUSTMENT SYSTEM, AND VERTICAL GUIDE SYSTEM

(76) Inventor: Peter Riggle, 2112 S. Olympia, Kennewick, WA (US) 99337

( * ) Notice: Subject to any disclaimer, the term of this patent is extended or adjusted under 35 U.S.C. 154(b) by 527 days.

(21) Appl. No.: 11/101,010

(22) Filed: Apr. 7, 2005

(65) Prior Publication Data
US 2007/0008868 A1    Jan. 11, 2007

(51) Int. Cl.
*G11B 21/16* (2006.01)
*G11B 23/00* (2006.01)

(52) U.S. Cl. ........................ 369/245; 369/256
(58) Field of Classification Search ................. 369/248, 369/246, 249.1, 244.1, 176, 254, 255, 245, 369/256
See application file for complete search history.

(56) References Cited

U.S. PATENT DOCUMENTS

| | | | | |
|---|---|---|---|---|
| 4,018,447 A * | 4/1977 | Short | ........................ | 369/34.01 |
| 4,062,548 A * | 12/1977 | Kagata | ........................ | 369/246 |
| 4,098,512 A * | 7/1978 | Takizawa | ........................ | 369/216 |
| 4,170,360 A * | 10/1979 | Ohsawa | ........................ | 369/181 |
| 4,185,835 A * | 1/1980 | Robertson-Aikman | ........................ | 369/248 |
| 4,295,277 A * | 10/1981 | Dennesen et al. | ........................ | 33/655 |
| 4,340,957 A * | 7/1982 | Kuehn | ........................ | 369/256 |
| 4,455,641 A * | 6/1984 | Sliski | ........................ | 369/249.1 |
| 4,477,893 A * | 10/1984 | Yoshio | ........................ | 369/244.1 |
| 4,570,253 A * | 2/1986 | Firebaugh | ........................ | 369/255 |
| 4,587,646 A * | 5/1986 | Graham | ........................ | 369/248 |
| 4,628,500 A * | 12/1986 | Thigpen et al. | ........................ | 369/249.1 |
| 4,722,080 A * | 1/1988 | Dieckmann | ........................ | 369/254 |
| 4,734,902 A * | 3/1988 | Dennis et al. | ........................ | 369/176 |
| 7,106,685 B2 * | 9/2006 | Calaio | ........................ | 369/264 |

* cited by examiner

*Primary Examiner*—Brian E Miller
(74) *Attorney, Agent, or Firm*—Floyd E. Ivey

(57) ABSTRACT

An improved tone arm mounting system, for improved damping of tone arm system (100) vibrations. Tone arm system (100) is supported by tone arm pedestal (106). Adjuster screw (301) is affixed to the bottom of tone arm pedestal (106) so that adjuster screw axis of revolution (309) passes through or near tone arm system weight center of gravity (310). Adjuster screw (301), by threaded means, rotatably receives adjuster wheel (302), which is thin and is large in diameter, for easy access to its outer edge for manual or mechanical operation. Rotation of adjuster wheel (302) on adjuster screw (301) changes the height of tone arm pedestal (106) and thereby changes VTA (110).

The tone arm system (100) is supported by arm board (206) without vertical connection to arm board (206) thereby damping mechanical vibrations and improving signal quality. A lightly loaded vibration damping washer (306) can be used between thrust bushing (307) and adjuster wheel (302) to damp or filter transfer of mechanical vibrations from tone arm system (100) to arm board (206) and back into tone arm system (100).

20 Claims, 11 Drawing Sheets

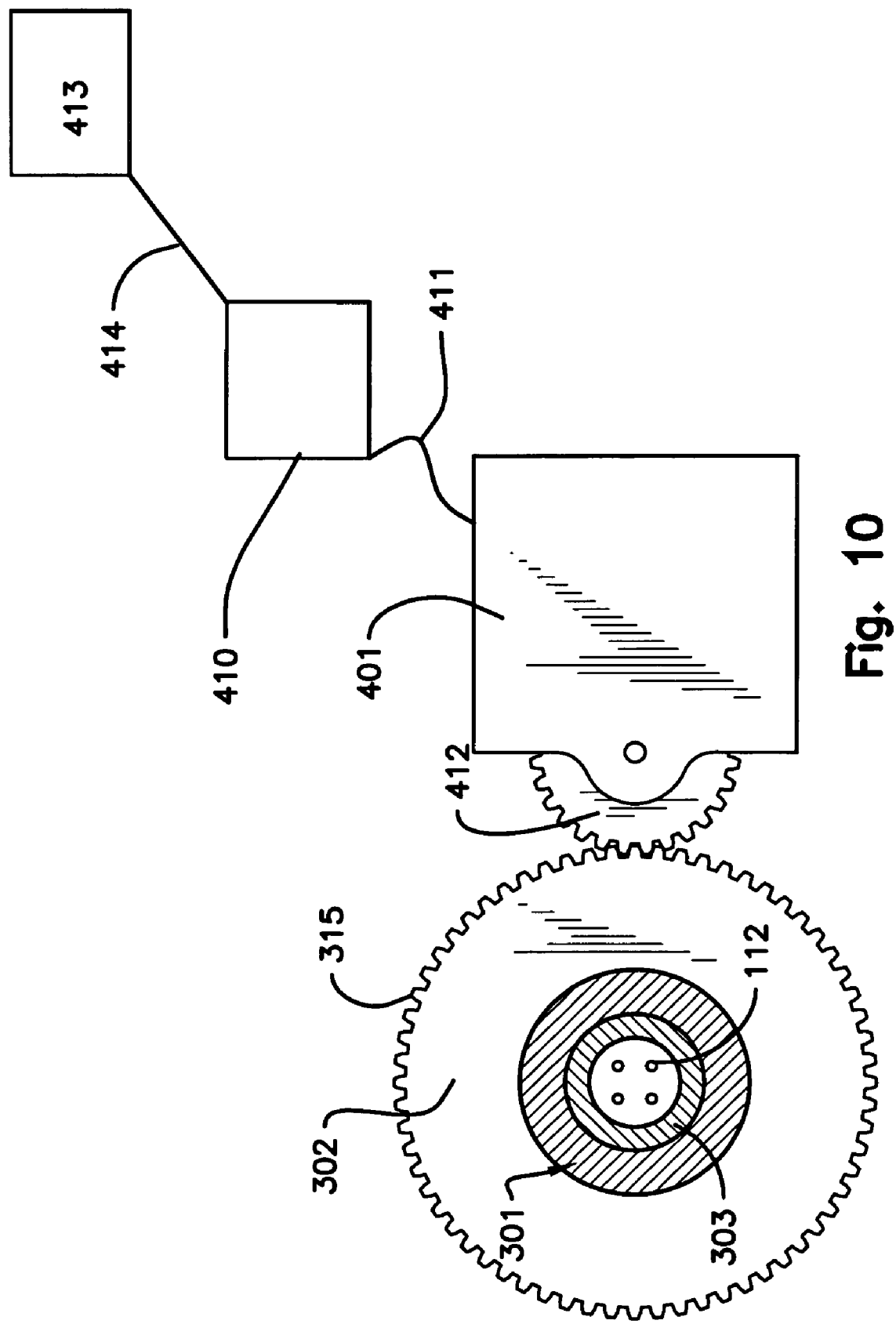

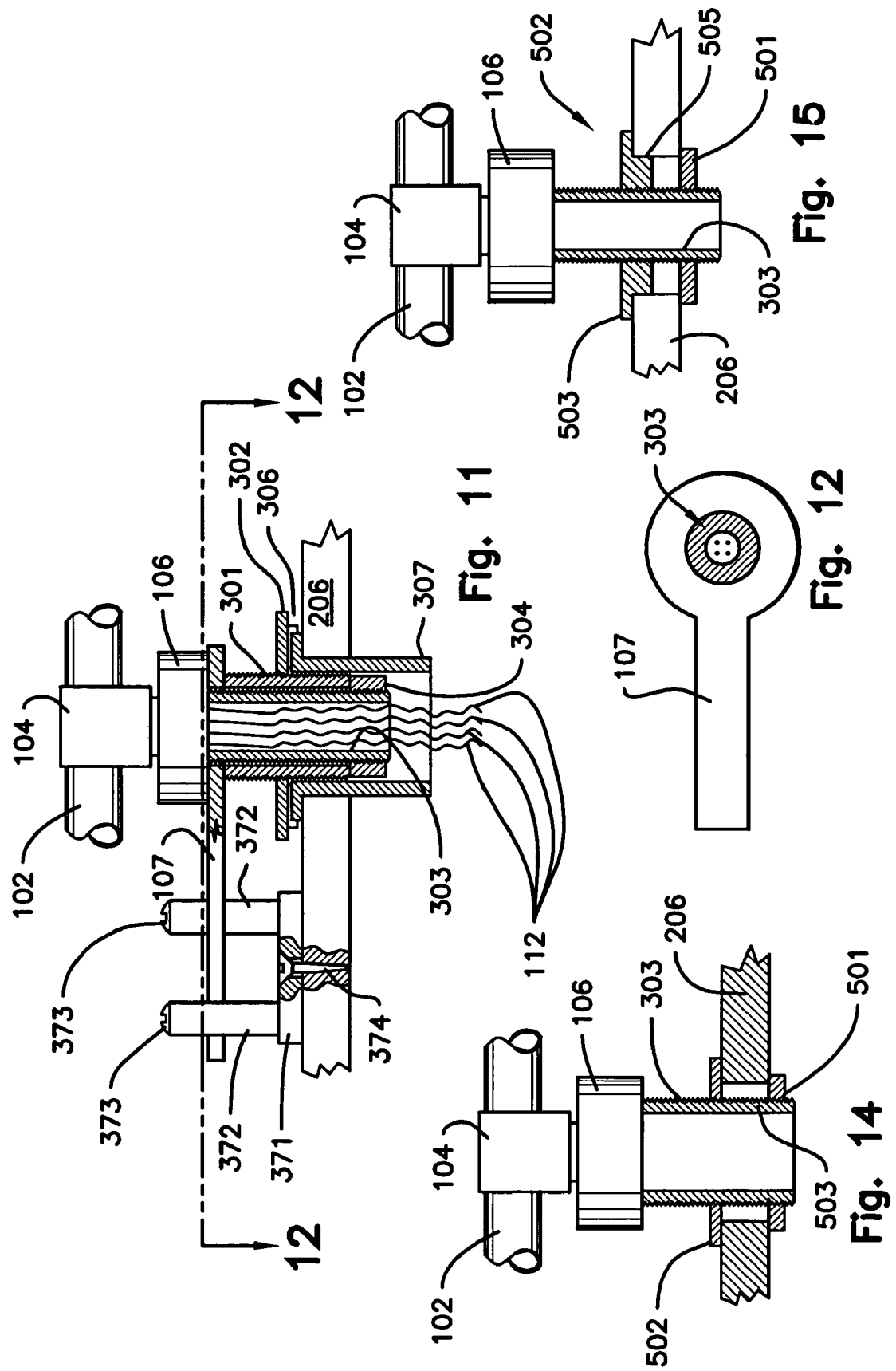

PHONOGRAPH TONE ARM MOUNTING, DECOUPLING, VERTICAL TRACKING ANGLE ADJUSTMENT SYSTEM, AND VERTICAL GUIDE SYSTEM

FIELD OF THE INVENTION

Phonographs, tone arms, turntables, tone arm mounting, decoupling, damping, and vertical tracking angle adjustment.

BACKGROUND OF THE INVENTION

The basic modern phonograph system uses a flat disk phonograph record with spiral cut grooves. The record is played on a turntable system which spins the phonograph record at constant rotational speed, using a tone arm system mounted on the arm board, plinth, or other structure of the turntable system (hereinafter referred to as the arm board).

The tone arm system configuration in greatest use consists of an arm with a pickup cartridge at one end and a counterweight at the other end, and with a tone arm pivot system (hereinafter referred to as the tone arm pivot) for rotation of the arm with two degrees of freedom, one horizontal, and one vertical. The tone arm pivot is located near the balance point of the pickup cartridge, tone arm proper, and counterweight. The tone arm pivot is supported by a pedestal or column (hereinafter referred to as the tone arm pedestal), which is mounted to the arm board. The invention discussed herein applies to turntables in which the phonograph record lies in an approximately horizontal plane.

Those skilled in the art of phonograph systems are aware of the following:

1. The angle, during playback, between the axis of the playback stylus (hereinafter referred to as the stylus) and a perpendicular to the plane of the phonograph record disk is known as the Stylus Rake Angle (hereinafter SRA). The angle, during recording, between the axis of the cutter and a perpendicular to the plane of the master phonograph record disk is known as the Cutter Rake Angle (hereinafter CRA).
2. The CRA varies from phonograph record to phonograph record.
3. Best playback occurs when the SRA is close in value to the CRA associated with the phonograph record being played.
4. It is desirable to have a means to easily adjust the SRA to minimize playback signal distortion. It is even more desirable to have a means to easily adjust the SRA while the phonograph record is playing, to allow audible optimization of the perceived quality of the sound.
5. It is possible to produce desired changes in the SRA by raising or lowering the tone arm pedestal, relative to the arm board, by various means.
6. SRA adjustment means provided by the prior art to raise and lower the tone arm pedestal have one or more of the following attributes: a) time consuming to adjust, b) difficult to adjust precisely, c) impossible to adjust with the phonograph record in play, d) require the tone arm system to be mechanically connected to the arm board, or e) use a screw driven elevator column with its vertical axis offset substantially from a vertical axis passing through the center of the tone arm pivot.
7. One prior art means of raising the tone arm pedestal height is the placement of shims under the tone arm pedestal. This means is time consuming to adjust, is difficult to adjust precisely, is impossible to adjust with the phonograph record in play, and requires the tone arm to be mechanically connected to the arm board.
8. Another prior art means of raising the tone arm pedestal is the use of a collar attached to the arm board, through which a vertical pedestal mounting stud passes, said pedestal mounting stud emanating from the tone arm pedestal bottom. The pedestal mounting stud is held in the collar by one or more set screws operating in one or more threaded radial holes through the collar. This means is time consuming to adjust, is difficult to adjust precisely, is impossible to adjust with the phonograph record in play, and requires the tone arm to be mechanically connected to the arm board.
9. Another prior art means of raising the tone arm pedestal uses a pair of nuts running on a threaded vertical pedestal mounting stud emanating from the tone arm pedestal bottom and received by a mounting hole in the arm board. The arm board is trapped between the two nuts, holding the pedestal mounting stud perpendicular to the arm board. In some cases the upper nut is made with a thin wall received by the mounting hole in the arm board, allowing the nut threads to occupy the thickness of the arm board, with a thin flange on top of the upper nut to bear on the arm board upper surface, thereby reducing the minimum height addition the upper nut imparts to the tone arm pedestal. This means is time consuming to adjust, is impossible to adjust with the phonograph record in play, and requires the tone arm to be mechanically connected to the arm board.
10. Another prior art means of raising and lowering the tone arm pedestal uses a screw driven elevator means which is laterally displaced a substantial amount from the vertical axis of the tone arm pivot. This means is complicated and expensive to produce, and requires the tone arm to be mechanically connected to the arm board. Because of its eccentric mounting, the elevator means a) interferes with the reduction of vibration at the interface between the tone arm and the arm board, and b) experiences increased frictional drag from horizontal reactions associated with eccentricity of the elevator means.
11. Another prior art means to produce changes in the SRA is by changing shims between the pickup cartridge and the tone arm. The pickup cartridge may be shimmed parallel or at an angle to the pickup cartridge mounting surface provided by the tone arm system. This method of changing SRA is time consuming to adjust, requiring a complete and exacting realignment of the pickup cartridge each time the shims are changed. Using this method It is impossible to adjust SRA with the phonograph record in play.
12. Another prior art means to produce changes in the SRA is by changing the thickness of the turntable mat between the platter and the phonograph record. This means requires storage of alternative turntable mats, is difficult to adjust precisely, is impossible to adjust with the phonograph record in play, and requires the use of a turntable mat, which some users consider undesirable.

The SRA is closely associated with the angle between the phonograph pickup cantilever and the plane of the phonograph record, said angle commonly called the Vertical Tracking Angle (hereinafter VTA). Changes in the SRA are accompanied by changes in the VTA. In common parlance, when one raises and lowers the tone arm pedestal to change the SRA, one is said to be adjusting the VTA. Because the term "VTA adjustment" is in more common use than the term "SRA adjustment," the title of the invention refers to a "Vertical Tracking Angle Adjustment System."

Those skilled in the art of phonograph systems are also aware that:

1. Mechanical vibrations originating in the oscillation of the stylus travel through the pickup cartridge, the tone arm proper, the tone arm pivot, and the tone arm pedestal, to the arm board, where they can be reflected or transferred back into the arm and picked up in delayed manner by the pickup cartridge, blurring the signal and the perceived sound.

2. Decoupling the tone arm pedestal from the arm board, through reduced connection force between the tone arm pedestal and the arm board can reduce transfer of vibrations from the tone arm system to the arm board, and back to the tone arm system, thereby improving the quality of the signal and of the perceived sound.

Further, those skilled in the art of phonograph systems are aware that:

1. With the tone arm connected to an arm board in accordance with prior art, performing adjustments or maintenance on a pickup cartridge or tone arm system is difficult and time consuming.

2. With the tone arm connected to an arm board in accordance with prior art, removing the tone arm system from a turntable or arm board is difficult and time consuming, As old as the phonograph is, many current observations on audiophile phonograph related web sites lament the fact that the best sound can only be achieved when the VTA is easily adjustable with the phonograph record in play, and that only very expensive tone arm systems offer VTA adjustment while the phonograph record plays.

The invention discussed herein provides a fresh approach to VTA adjustment and offers a new, simple, and low cost way to construct a VTA adjuster that functions with the phonograph record in play. The low cost VTA adjustment methods currently available do not work with the phonograph record in play, and in most cases require the tone arm system to be disconnected from the turntable system, or the pickup cartridge to be removed from the tone arm, to perform VTA adjustments. These methods are almost hopelessly clumsy to use.

Further, the invention discussed herein provides additional advantages of 1) decoupling the tone arm system from the arm board, which eliminates the connecting force, improving damping of tone arm vibrations, 2) allowing a damping washer to be easily added to or removed from the interface between the tone arm system and the turntable system, for tailoring of the perceived sound, and 3) allowing the tone arm to be easily removed from and installed into the arm board, allowing easy maintenance and adjustments.

SUMMARY OF THE INVENTION

The invention (300) described herein:

1. Provides easy adjustment of VTA (110):

Adjuster wheel (302) provides easy adjustment of VTA (110), and thereby the important SRA (111), by changing the height of tone arm pedestal (106), with or without phonograph record (201) in play. Adjuster wheel (302) is located directly below tone arm pedestal (106) and runs on adjuster screw external threads (312). Adjuster screw (301) is affixed to and extends vertically downward from tone arm pedestal bottom (114). Adjuster wheel (302) and adjuster screw (301) have a common vertical axis, adjuster screw axis of revolution (309), aligned closely to tone arm system weight center of gravity (310). Adjuster wheel (302) has a substantially larger diameter than tone arm pedestal (106) allowing access to its rim for easy manual operation or mechanical operation using remote control (213)

2. Improves sound quality by decoupling tone arm system (100) from arm board (206) using an improved mounting system in which:

a) Thrust bushing (307), which has a vertical axis, and is fixed in arm board (206), receives adjuster screw (301) and supports adjuster wheel (302). Thrust bushing) (307) and vertical guide system (370) work together to limit motion of tone arm pedestal (106) to vertical translation without tipping, rotation or horizontal translation, said vertical translation achieved without fasteners holding tone arm system (100) down to arm board (206).

b) Tone arm pedestal (106) is held down to arm board (206) by nothing more than the weight of tone arm system (100), thereby minimizing the connecting force between tone arm system (100) and turntable system (200), thereby reducing the transfer of vibration from tone arm system (100) to arm board (206) and back again, and thereby improving the quality of the signal and of the perceived sound.

c) Despite the lack of fasteners holding tone arm pedestal (106) down to arm board (206), the invention (300) allows operation of tone arm system (100) and all of its features (including, but not limited to: lifting the arm, moving the arm, operating a mechanical arm lift, operating an arm rest and lock (113), adjusting counterweight (105), adjusting the tracking force, adjusting the anti-skating force), and operating adjuster wheel (302), and making adjustments to pickup cartridge (101), without sliding or tipping of tone arm pedestal (106) or rotation of tone arm pedestal (106) about adjuster screw axis of revolution (109).

3. Simplifies tone arm system (100) installation to and removal from arm board (206):

The invention (300) eliminates fastening of tone arm pedestal (106) to arm board (206), thereby simplifying tone arm system (100) installation to and removal from arm board (206), at the time of manufacture, during shipping, and in use of turntable system (200) and tone arm system (100) by the end user. With this invention (300), tone arm system (100) may be lifted directly out of and returned to thrust bushing (307) affixed to arm board (206), without breaking or making mechanical fastener connections, and with no access to the bottom of arm board (206) other than to guide the signal leads (112) out of or in to turntable system (200).

Ease of assembly and disassembly has high value, because a) it is difficult to work on tone arm system (100) and pickup cartridge (101) with tone arm system (100) fixed to turntable system (200), and b) using only the prior art, it is difficult and/or time consuming to assemble and disassemble tone arm system (100) to and from turntable system (200).

4. Allows the use of lightly loaded damping washer (306):

The invention (300) allows the use of a lightly loaded damping washer (306) which serves as a vibration damping and filtering layer between tone arm pedestal (106) and thrust bushing top face (308), or between adjuster wheel (302) thrust bushing top face (308), allowing damping and filtering characteristics to be tailored for best perceived sound.

An invention similar to the present disclosure was sketched by the inventor in a log book. This invention used a hold-down spring below arm board (206) to hold tone arm system (100) down against the top of arm board (206), and used an axial slot (377) in adjuster screw (301) as the vertical guide system in conjunction with a tongued thrust washer fixed to arm board (206). Detailed drawings of parts for this concept were completed, at which time parts drawings were taken to a machine shop for fabrication. Fabrication cost concerns caused the inventor to rework the invention to change vertical guide system (370) to a configuration not relying on adjuster screw (301). Revised parts specifications were faxed to the machinist. Parts were received from the machinist, at which time a prototype of the invention (300) was assembled on a turntable system (200). It was found that the hold-down spring created too much force and friction to allow smooth and easy operation of adjuster wheel (302). On the same day the spring was removed, and it was observed that the invention (300) works perfectly well without the spring, and sounds better than with tone arm pedestal (106) fastened down tightly to arm board (206) as in a conventional installation. A thrust bushing (307) was subsequently added to the invention (300) to improve location of tone arm system (100) and to reduce friction, which affects operation of adjuster wheel (302) and interferes with decoupling and associated vibration damping. Thus, a full scale prototype of the invention (300) as described herein has been constructed, operates as intended, and provides the benefits discussed herein. Photographs of the hardware are available.

BRIEF DESCRIPTION OF THE DRAWINGS

FIG. 10 is section view from FIG. 1 looking down on adjuster wheel (302) showing electrical power and control source (410) coupled through power and control lead (411) to reversible electric motor means (400) with mechanical output means (412) coupled to an adjuster wheel (302) said adjuster wheel (302) having adjuster wheel mechanical drive means (315). The adjuster wheel mechanical drive means (315) and mechanical output means (412) include any mechanical drive system, including but not limited to one or more gears, one or more rollers, one or more belts, one or more drive chains, one or more actuators, one or more escapements, and/or one or more clutches.

FIG. 11 is a detail side elevation view from FIG. 1 of an embodiment of vertical guide system (370) with a cutaway showing a means of configuring horizontal projection (107) and attaching horizontal projection (107) to tone arm pedestal (106).

FIG. 12 is a sectional plan view from FIG. 11 showing a platform of horizontal projection (107) as configured in FIG. 11.

FIG. 14 is a detail elevation view from FIG. 1 with a cut-away showing a prior art means of mounting tone arm system (100) and adjusting the height of tone arm pedestal (106) above arm board (206). Pedestal mounting stud (303) which is integral with tone arm pedestal (106) is received by a hole (503) in arm board (206) and clamped to arm board (206) by top nut (502) above arm board (206) and bottom nut (501) below arm board (206). In this prior art means vertical guide system (370) is absent. Rotation of tone arm pedestal (106) is prevented by clamping arm board (206) tightly between nut (502) and nut 501.

FIG. 15 is a detail elevation view from FIG. 1 with a cutaway showing another prior art means of mounting tone arm system (100) and adjusting the height of tone arm pedestal (106) above arm board (206). This means is like the means of FIG. 14, except that top nut 502 has a thin top flange (503) which bears on the top of arm board (206), and a skirt (505) threaded to receive pedestal mounting stud (303). The advantage of this means over the means of FIG. 14 is that tone arm pedestal (106) can be adjusted closer to arm board (206), providing a greater range of tone arm pedestal (106) height adjustment. In this prior art means vertical guide system (370) is absent. Rotation of tone arm pedestal (106) is prevented by clamping arm board (206) tightly between nut (502) and nut 501.

DETAILED DESCRIPTION OF THE INVENTION

Figure 1:
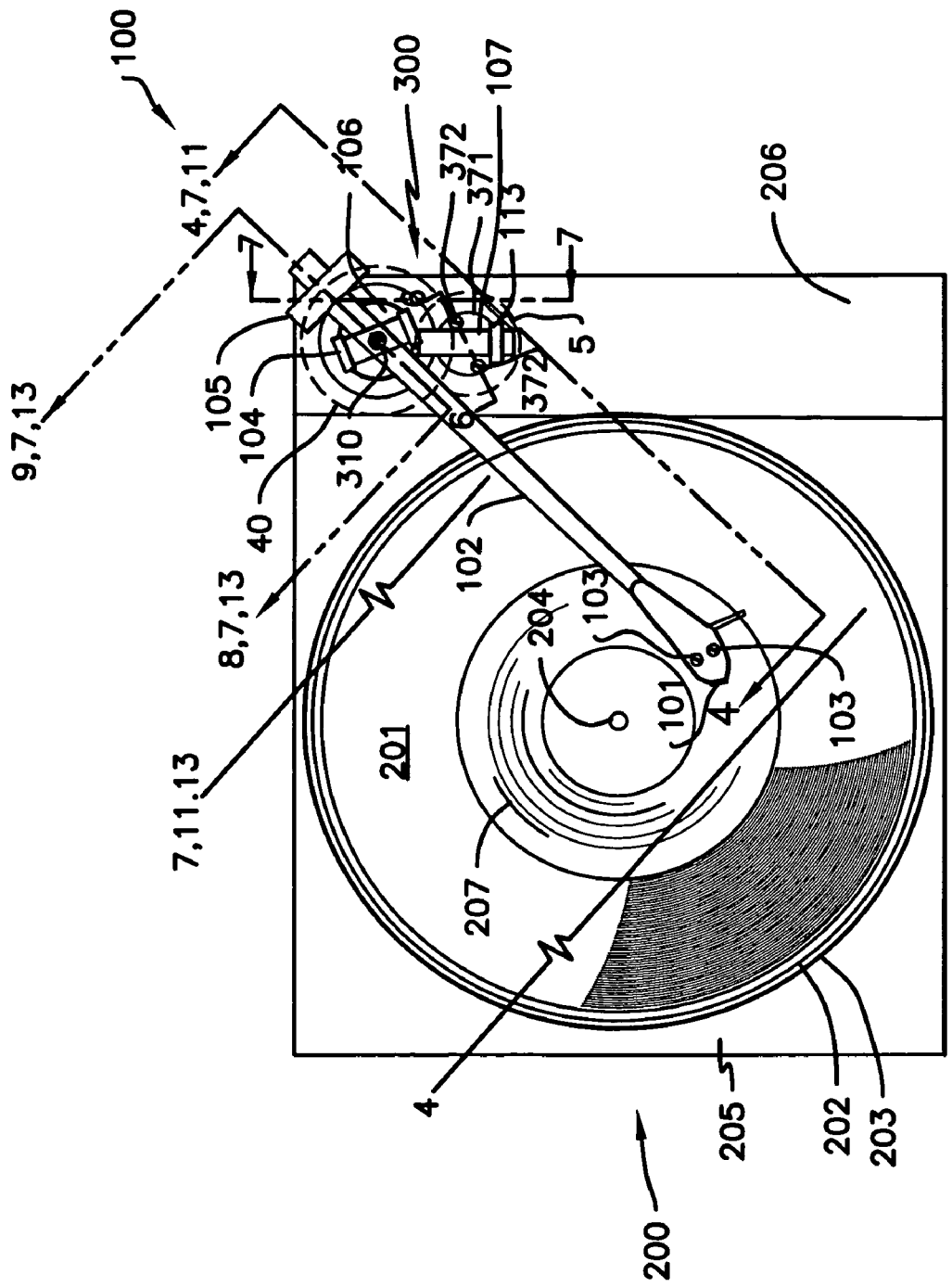
FIG. 1 is a top plan view showing tone arm system (100) and turntable system (200).
Figure 2:
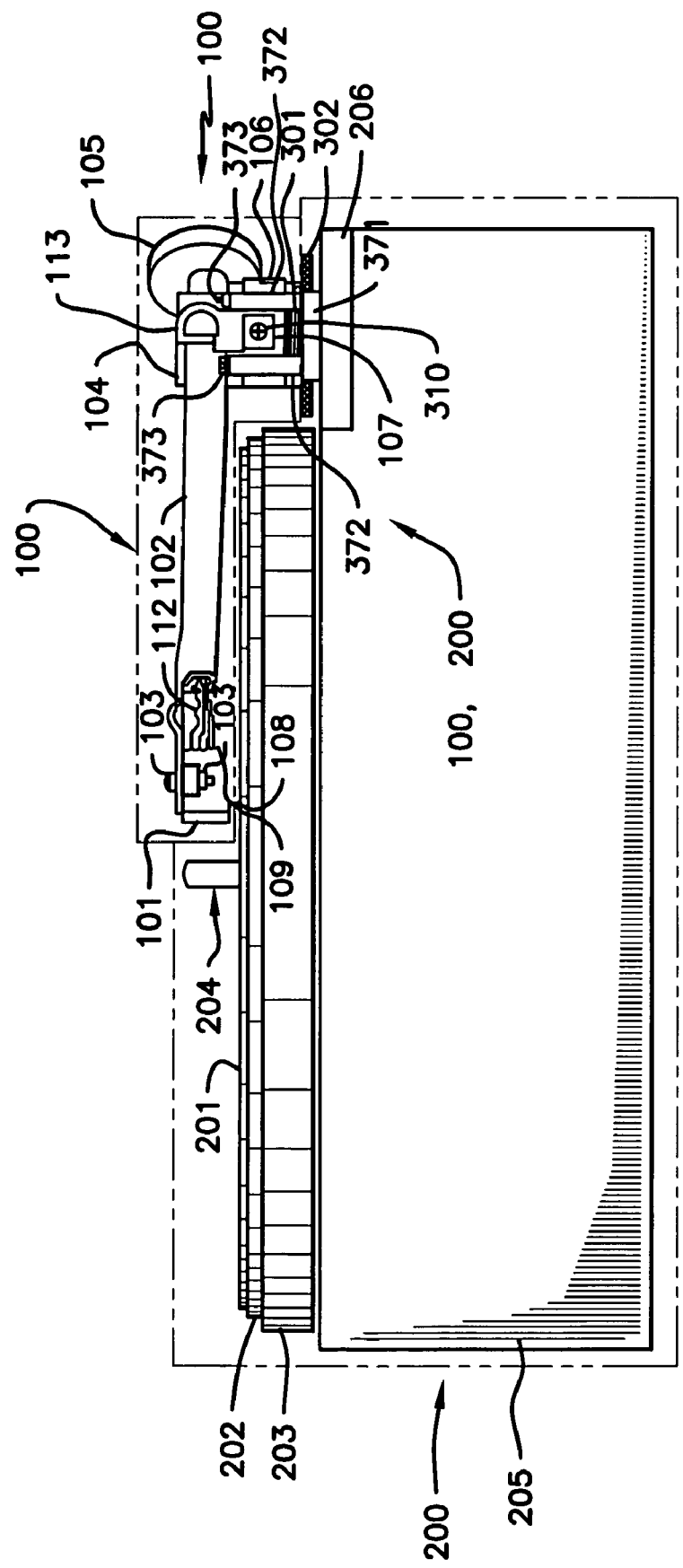
FIG. 2 is a front elevation view showing tone arm system (100) and turntable system (200).
Figure 3:
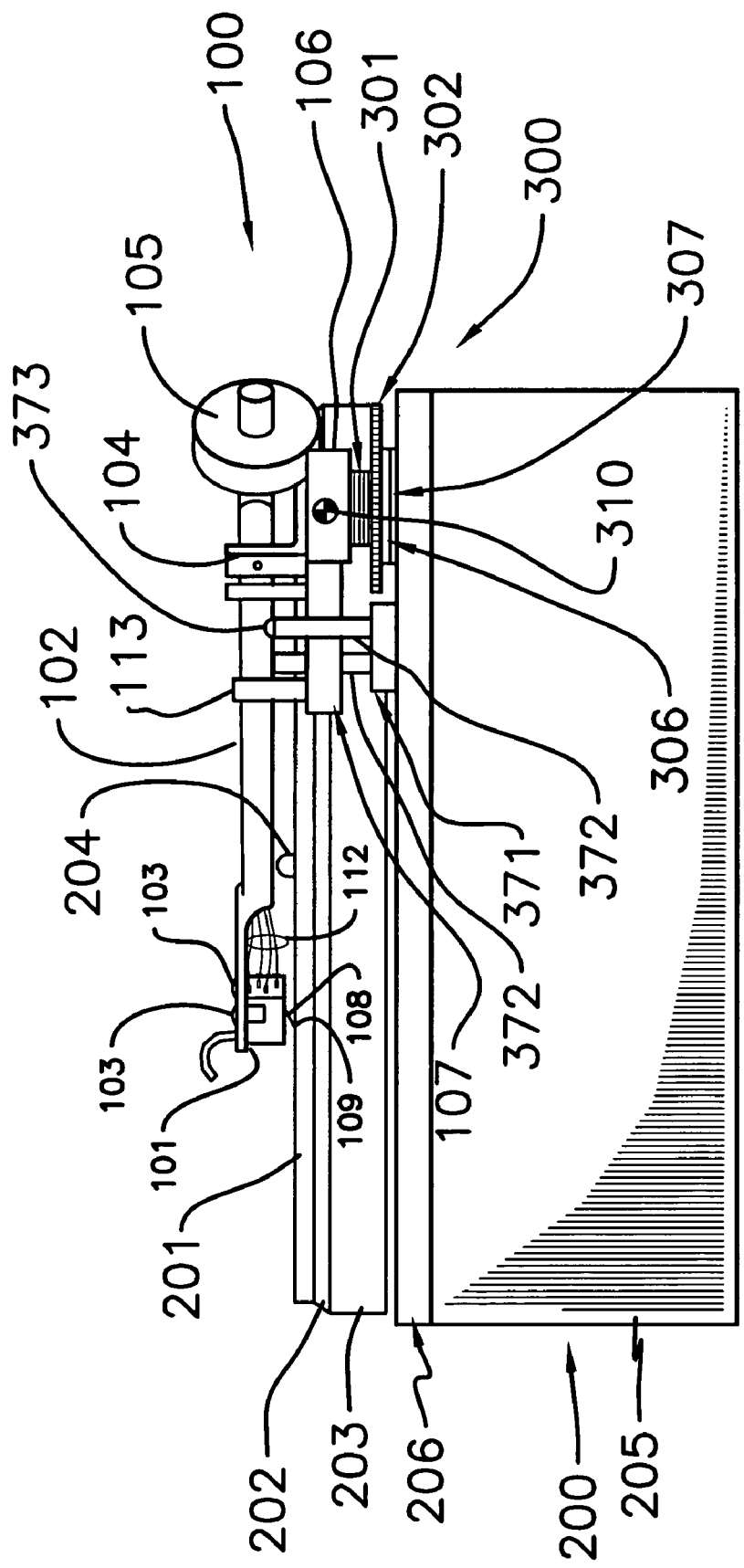
FIG. 3 is a side elevation view showing tone arm system (100) and turntable system (200)

FIGS. 1, 2, and 3 show tone arm system (100) mounted on turntable system (200) along with components of the invention (300). Dashed lines in FIG. 2 show the approximate boundaries of tone arm system (100) and turntable system (200). The invention (300) serves as an improved system for mounting tone arm system (100) to turntable system (200) with benefits in adjustment of VTA (110), reduction of tone arm system vibration, and improved ease of installation and removal of tone arm system (100) from turntable system (200).

Regarding tone arm system (100): Pickup cartridge (101) is attached to tone arm proper (102) by pickup cartridge mounting means (103). Tone arm proper (102) is supported by tone arm pivot (104), which allows tone arm proper (102), and components attached thereto, to rotate with two degrees of freedom, one horizontal and one vertical. Counterweight (105) balances the major portion of the weight of tone arm proper (102) and all components attached thereto, resulting in a small downward tracking force at stylus (109). Tone arm pivot (104) is supported by tone arm pedestal (106). Horizontal projection (107) from or of tone arm pedestal (106) is used by vertical guide system (370) [see discussion of FIGS. 4 through 7 below for discussion of use of vertical guide system (370) in conjunction with horizontal projection (107)].

Regarding turntable system (200): Phonograph record (201) rests upon turntable mat (202) which rests upon platter (203). Phonograph record (201) and turntable mat (202) are centered on platter (203) by spindle (204) which is fixed in platter (203) at the center of platter (203). Platter (203) is suspended and rotated at uniform speed about its center by means within plinth (205). Arm board (206) is attached to plinth (205), and used to support tone arm system (100).

Figure 4:
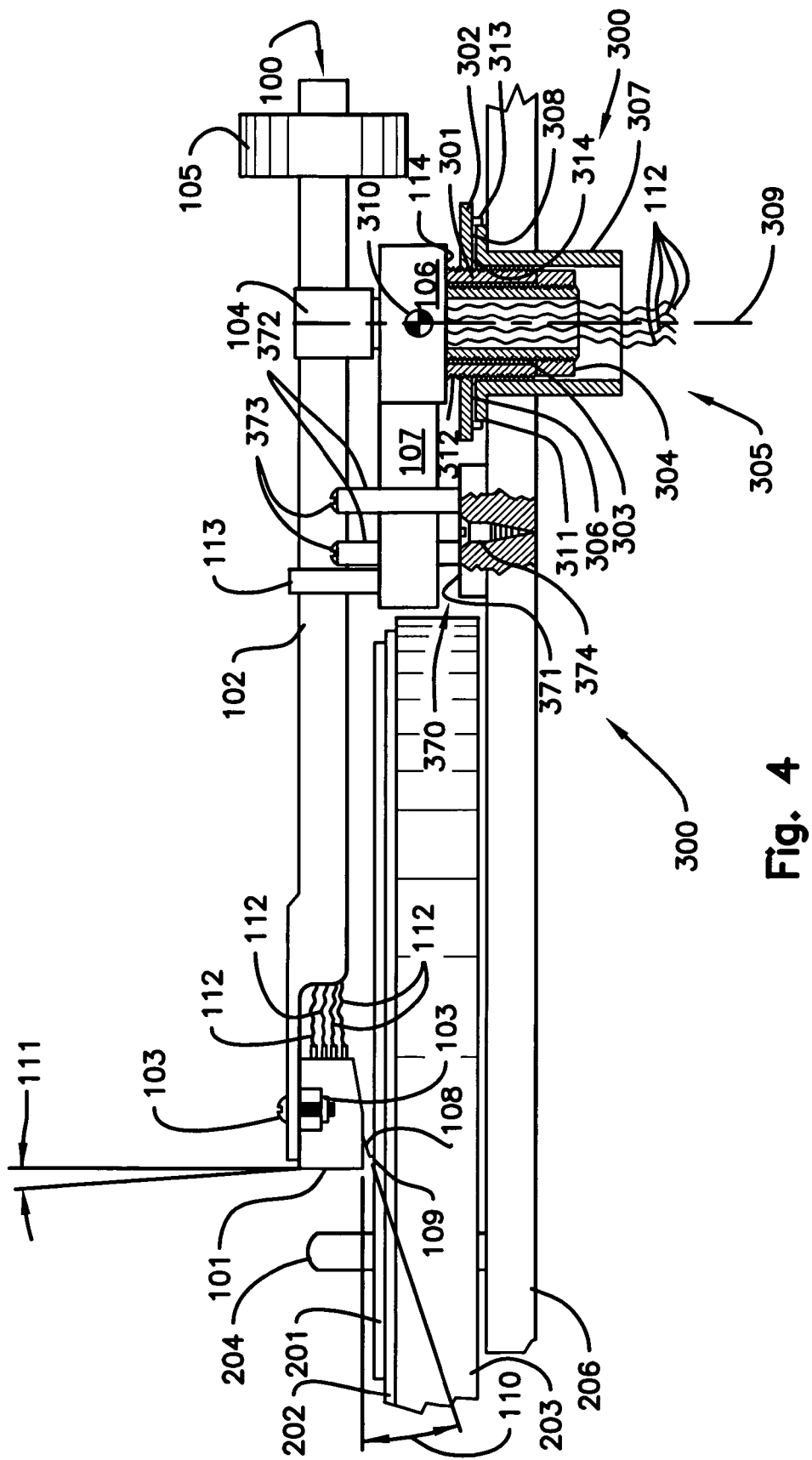
FIG. 4 is a sectional elevation view from FIG. 1 with a cut-away showing the details of the invention (300), including adjuster screw (301), adjuster wheel (302), pedestal mounting stud (303), adjuster screw capture nut (304), damping washer (306), thrust bushing (307), and vertical guide system (370).

Refer now to FIG. 4. Pickup cartridge (101) includes cantilever (108) and stylus (109). Stylus (109) engages record groove (207). The angle between the axis of cantilever (108) and the surface of phonograph record (201) is VTA (110). The angle between the axis of stylus (109) and a vertical to the surface of phonograph record (201) is SRA (111). Signal leads (112) carry electrical oscillations produced by pickup cartridge (101).

In prior art tone arm pedestal (106) is firmly fixed to arm board (206) by various means.

In the invention (300), tone arm pedestal (106) is firmly affixed to and supported by adjuster screw (301), which is supported by adjuster wheel (302). Adjuster wheel (302) runs on fine threads, adjuster screw external threads (312). Adjuster wheel (302) has a substantially larger diameter than tone arm pedestal (106) to allow easy access for manual operation or mechanical operation using remote control transmitter (413).

Fine threads for adjuster screw (301) and adjuster wheel (302), for example 40 threads per inch, are important, allowing adjuster wheel (302) to be thin, providing fine resolution in the adjustment of VTA (110), and providing low forces to operate adjuster wheel (302).

It is desirable for adjuster wheel (302) to be thin, for example 1/10 inch thick or less, to minimize the lowest elevation of tone arm pedestal (106), and thereby maximize the range of tone arm pedestal (106) height adjustment.

Adjuster screw (301) is affixed to tone arm pedestal (106) by adjuster screw fastening means (305). One possible adjuster screw fastening means (305) to affix adjuster screw (301) to tone arm pedestal (106) is use of pedestal mounting stud (303), which receives adjuster screw (301) and is securely fixed to tone arm pedestal bottom (114) of tone arm pedestal (106) by any of various conventional means, and use of adjuster screw capture nut (304), threaded onto the lower end of pedestal mounting stud (303) and tightened against adjuster screw (301).

Adjuster wheel (302) is supported by damping washer (306), which is fabricated from a material with desirable mechanical hysteresis characteristics. Damping washer (306) serves as a mechanical energy absorbing layer to dampen and filter vibrations of tone arm system (100). Adjuster wheel (302) may be supported by thrust bushing (307) if damping washer (306) is excluded from the invention (300).

Damping washer (306) may be included in or excluded from the invention (300), depending on perceived sonic benefits. The material for damping washer (306) is selected as a result of vibration measurements or as a result of subjective listening evaluations. Damping washer (306) is constructed with a damping washer raised rim (313) to locate damping washer (306) with the outer diameter of thrust bushing (307). Damping washer hole (314) in damping washer (306) is larger than the outside diameter of adjuster screw (301) to prevent interference between adjuster screw (301) and damping washer (306).

Thrust bushing (307) provides vertical support for damping washer (306) and adjuster wheel (302), and all the loads supported by adjuster wheel (302). Thrust bushing (307) is installed into arm board (206) by various means, including but not limited to press fit, cement or adhesive, threaded connection, or retainer. Thrust bushing (307) is termed a bushing, but may also be any appropriate close tolerance vertical axis cylindrical hole or aperture through arm board (206).

Adjuster screw (301) has a low clearance running fit with thrust bushing (307), to provide accurate positioning of tone arm system (100) upon arm board (206).

Thrust bushing (307), and adjuster screw (301) may or may not have sufficient length to add significantly to the overturning resistance of tone arm system (100).

Adjuster screw (301) is of uniform thread form and cross sectional dimensions along its length to allow insertion and removal from thrust bushing (307). Adjuster screw capture nut (304) is of smaller diameter than adjuster screw (301) to avoid interference with thrust bushing (307) during insertion and removal of adjuster screw (301) to and from thrust bushing (307).

Operation of adjuster wheel (302) raises and lowers tone arm pedestal (106), changing the deviation from level of tone arm proper (102), thereby providing corresponding changes to VTA (110) and the important SRA (111). Experience with a prototype of the invention (300) shows that adjuster wheel (302) may be operated with phonograph record (201) in play with no adverse consequences.

The invention (300) can be used as a tone arm mounting and vertical guide system without the benefit of adjuster wheel (302), in which case threads are not required on the outer surface of adjuster screw (301).

Adjuster screw (301) is affixed to tone arm pedestal (106) so that a vertical line through tone arm weight center of gravity (310) is close to adjuster screw axis of revolution (309). The vertical line through tone arm system weight center of gravity (310) must be as near or nearer to adjuster screw axis of revolution (309) as is thrust bushing outer edge (311), so that under just the weight of tone arm system (100), gravitational overturning will not cause friction between the outside of adjuster screw (301) and the bore of thrust bushing (307), thereby assuring that said friction between adjuster screw (301) and the bore of thrust bushing (307) does not a) in effect connect tone arm system (100) to arm board (206), thereby interfering with vibration damping at the interfaces between adjuster wheel (302), damping washer (306), and thrust bushing (307), and b) increase the effort required to rotate adjuster screw (301).

Note that the invention (300) allows tone arm system (100) to be removed from arm board (206) and reinstalled without breaking or making any mechanical connections.

Refer now to FIGS. 1, 2, 3 and 4. The invention (300) requires a means to prevent rotation of tone arm pedestal (106) around adjuster screw axis of revolution (309). This means is a vertical guide system (370). In broadest terms, vertical guide system (370) is a set of pedestal features (115) of tone arm pedestal (106), or any attachment thereto, keyed to a set of arm board features (208) of arm board (206), or any attachment thereto, such that tone arm pedestal (106) may be raised or lowered by adjuster wheel (302) without rotating about adjuster screw axis of revolution (309). In general said pedestal features (115), or arm board features (116), or both, will be of a cylindrical topology. Cylindrical features, by definition, are those which can be generated by vertical line elements.

Figure 5:
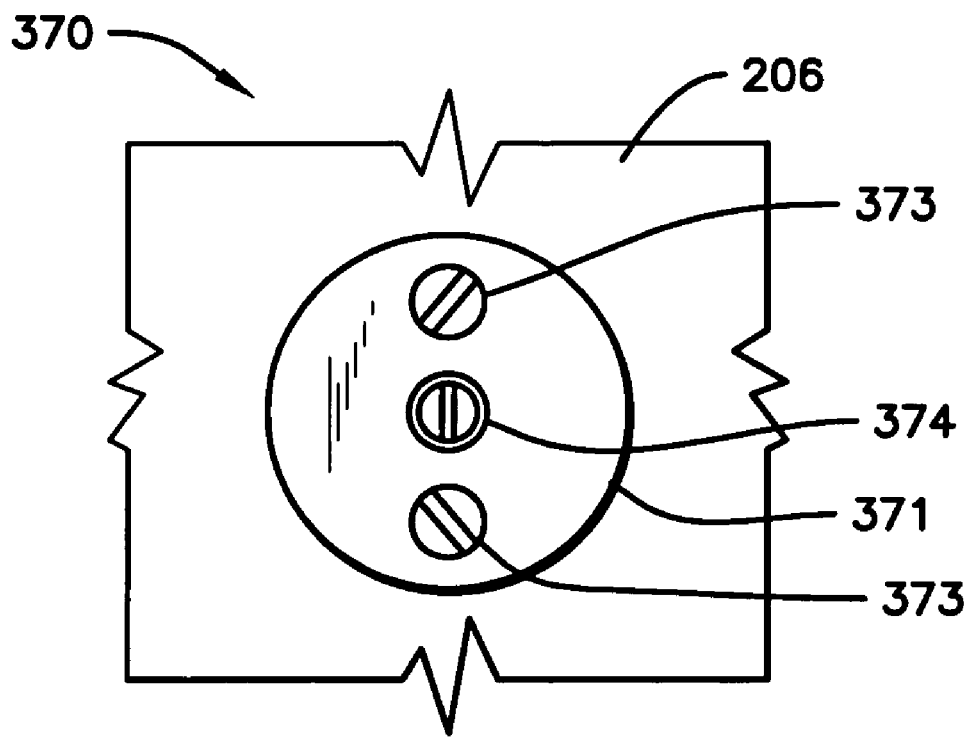
FIG. 5 is a plan view detail from FIG. 1 of a specific vertical guide system (370) with tone arm system (100) omitted for clarity.
Figure 6:
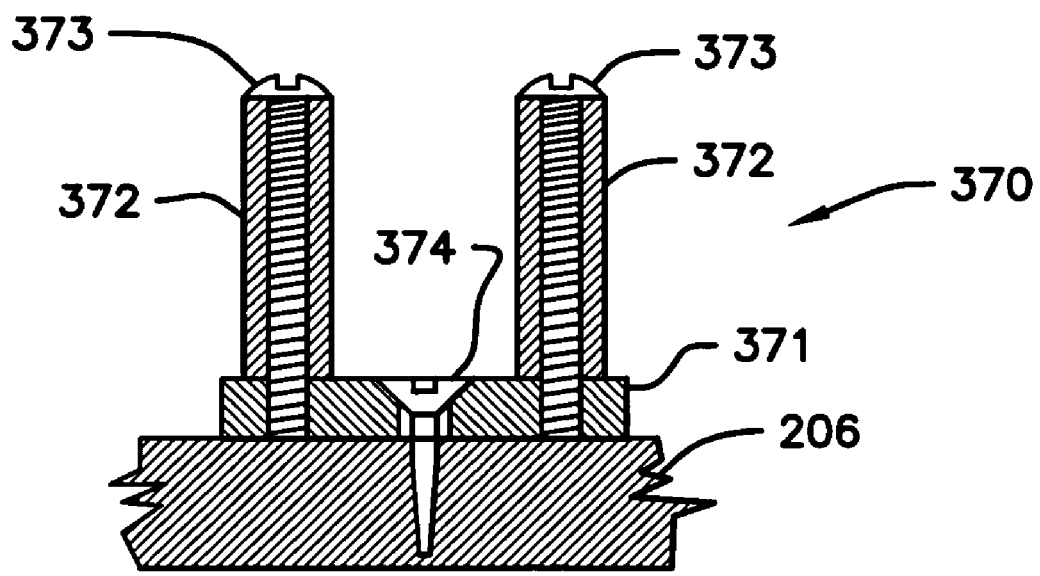
FIG. 6 is a detail sectional elevation view from FIG. 5 of vertical guide system (370) with tone arm system (100) omitted for clarity.

FIGS. 4, 5, and 6 show in more detail the embodiment of vertical guide system (370) shown in FIGS. 1, 2, and 3. All forms of the invention (300) use a vertical guide system (370) to prevent undesirable and harmful rotation of tone arm pedestal (106) about adjuster screw axis of revolution (309) when tone arm system (100) and its features (not all shown in the figures), and adjuster wheel (302), are operated or adjusted.

In the embodiment of vertical guide system (370) shown in FIGS. 4, 5, and 6, vertical guide system (370), is comprised of vertical guide base plate (371), vertical guide elements (372), vertical guide element attachment means (373), and vertical guide base plate attachment and tension adjustment means (374). Vertical guide system (370) uses two vertical cylindrical guide elements (372) to constrain horizontal projection (107) to a vertical path, thereby preventing tone arm system (100) from rotating about adjuster screw axis of revolution (309) when various features of tone arm system (100), not all shown in the figures, and adjuster wheel (302), are operated or adjusted.

Vertical guide elements (372) may be attached directly to arm board (206), but are preferably attached to vertical guide base plate (371), which is rotatable about vertical guide base plate attachment and tension adjustment means (374) providing a simple and effective free play adjusting means of adjusting the free play between vertical guide elements (372) and horizontal projection (107), therefore assuring minimal rotation of tone arm system (100) about adjuster screw axis of revolution (309) when adjuster wheel (302) and various tone arm system features, not all shown in the figures, are operated or adjusted.

To adjust vertical guide system (370) for minimum free play between vertical guide elements (372) and horizontal projection (107), vertical guide base plate (371) is manually rotated about vertical guide base plate attachment and tension adjustment means (374) until the desired amount of free play is achieved, and is there held in place by friction between vertical guide base plate (371) and arm board (206). The desired degree of friction between vertical guide base plate (371) and arm board (206) is adjusted by increasing or decreasing the connecting force provided by vertical guide base plate attachment and tension adjustment means (374).

Figure 7:
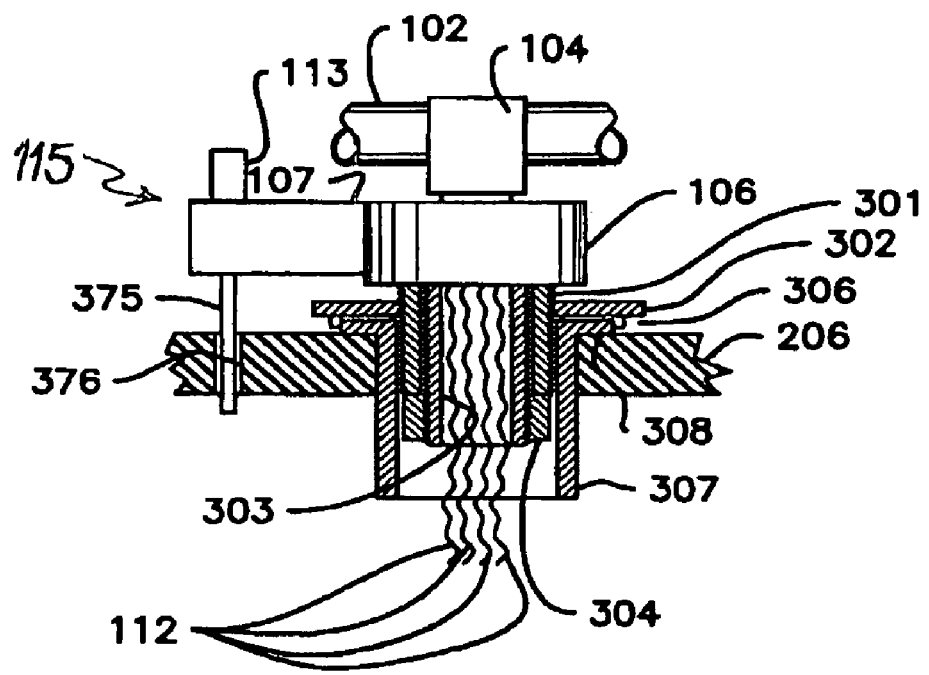
FIG. 7 is a detail side elevation view from FIG. 1 of an alternative embodiment of vertical guide system (370) with cut-away sections showing adjuster screw (301), adjuster wheel (302), thrust bushing (307), and related components, and also showing horizontal projection (107), vertical guide pin (375) and close fitting aperture (376).
Figure 7A:
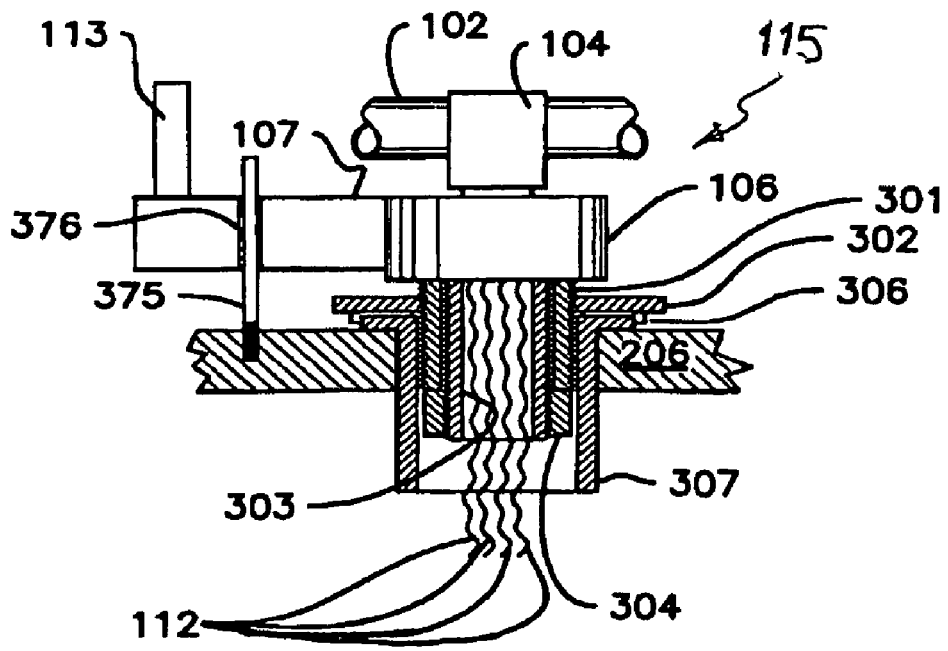
FIG. 7a is a detail of the vertical guide system (370), showing vertical guide pin (375) fixed to arm board (206) and received by close fitting aperture (376) in horizontal projection (107).

FIGS. 7 and 7a show a family of alternative embodiments of vertical guide system (370). In FIG. 7, vertical guide pin (375) is affixed to and extends vertically downward from horizontal projection (107), passing through close fitting aperture (376) in arm board (206) and thereby preventing rotation of tone arm pedestal (106) about adjuster screw axis of revolution (309). In the related vertical guide system (370), shown in FIG. 7a, vertical guide pin (375) is fixed to arm board (206) and is received by close fitting aperture (376) in horizontal projection (107).

Figure 8:
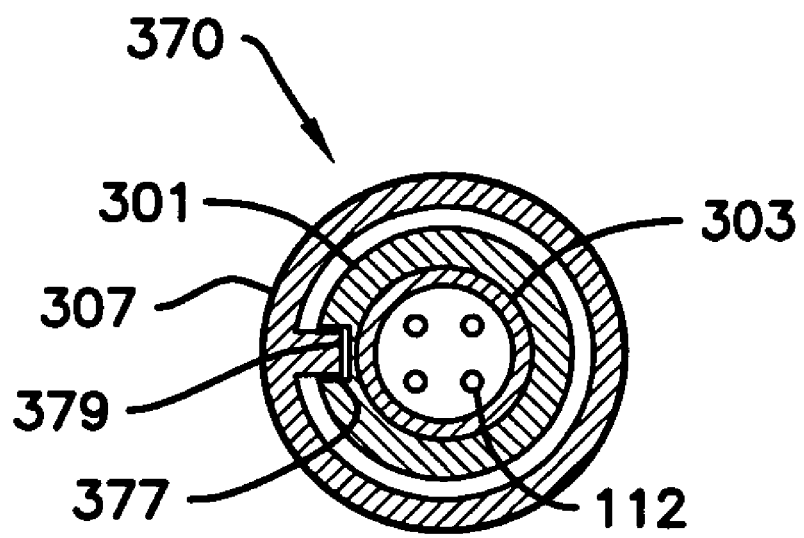
FIG. 8 is a section view from FIG. 1 showing another alternative embodiment of vertical guide system (370).
Figure 9:
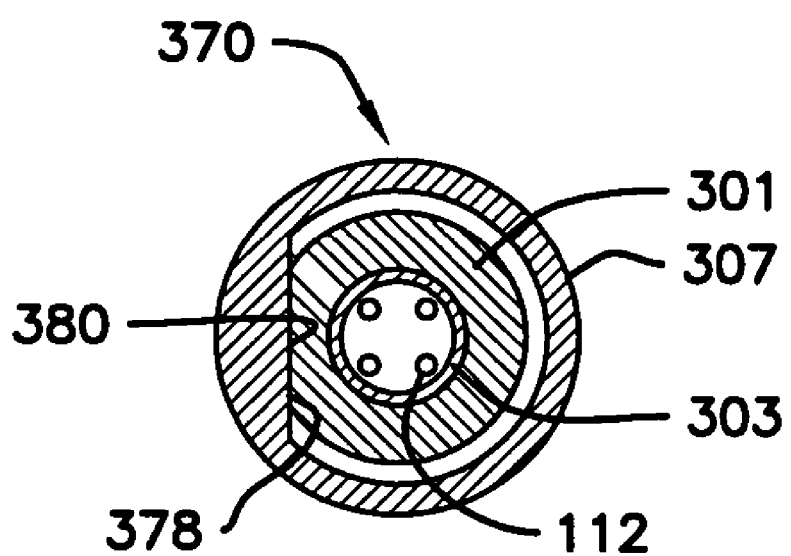
FIG. 9 is a section view from FIG. 1 showing yet another alternative embodiment of vertical guide system (370).

FIGS. 8 and 9 show a family of alternative embodiments of vertical guide system, vertical guide system alternative 2 (395), in which the rotation of adjuster screw (301) about adjuster screw axis of revolution (309), and thus rotation of tone arm pedestal (106), is prevented by longitudinal external features of uniform cross section in adjuster screw (301) keyed to corresponding longitudinal internal features of uniform cross section in thrust bushing (307), such as but not limited to one or more slots (377) in or external flats (378) of adjuster screw (301) keyed to corresponding splines (379) of or internal flats (380) in thrust bushing (307).

FIG. 10 shows a remote control means of operating adjuster wheel (302) using a remote control transmitter (413), sending control signals by transmission means (414) to electrical power and control source (410), coupled through power and control lead (411) to reversible electric motor means (401), said reversible electric motor means (401) having mechanical output means (412), said mechanical output means (412) driving adjuster wheel mechanical drive means (317).

FIG. 11 is a detail side elevation view of an embodiment of vertical guide system (370) with a cut-away showing a means of attaching horizontal projection (107) to tone arm pedestal (106). In this embodiment horizontal projection (107) is a flat part fabricated by various means, including but not limited to a) machining, b) punching or cutting from sheet stock, c) molding, d) casting. In this embodiment, horizontal projection (107) has a horizontal projection aperture (317) received by pedestal mounting stud (303) and is held against tone arm pedestal bottom (114) by force from adjuster screw (301), provided by tightening of adjuster screw capture nut (304) on the threads of pedestal mounting stud (303). Friction keeps horizontal projection (107) from rotation relative to tone arm pedestal (106).

FIG. 12 is a section from FIG. 11 showing the planform of horizontal projection (107) of the embodiment shown in FIG. 11.

Figure 13:
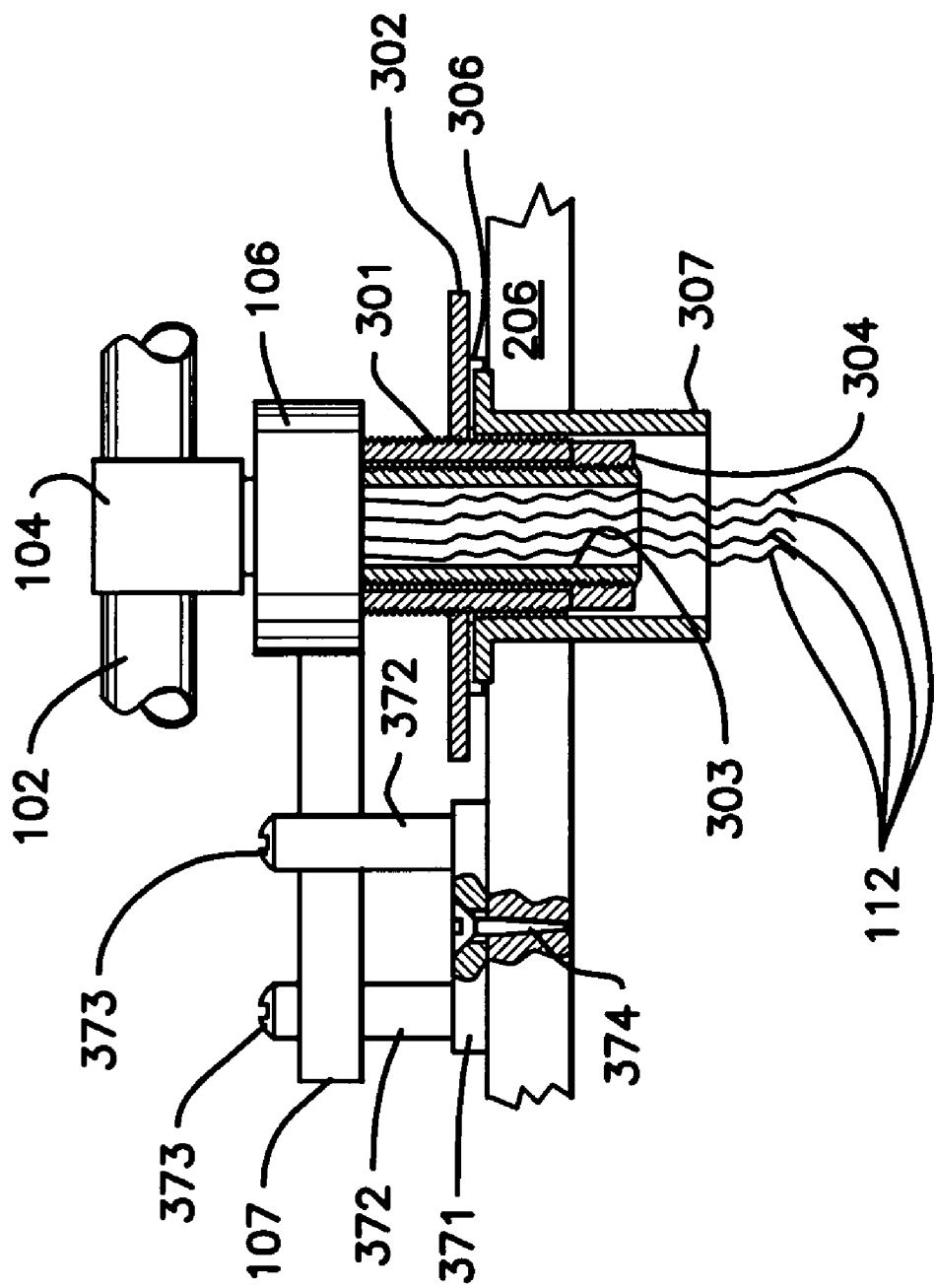
FIG. 13 is a detail elevation view from FIG. 1 with a cut-away showing a configuration of adjuster wheel (302), damping washer (306), and thrust bushing (307), said configuration minimizing the resulting height of tone arm pedestal (106) above arm board (206) when adjuster wheel (302) is turned to the position resulting in lowest height of tone arm pedestal (106) relative to arm board (206).
Figure 16:
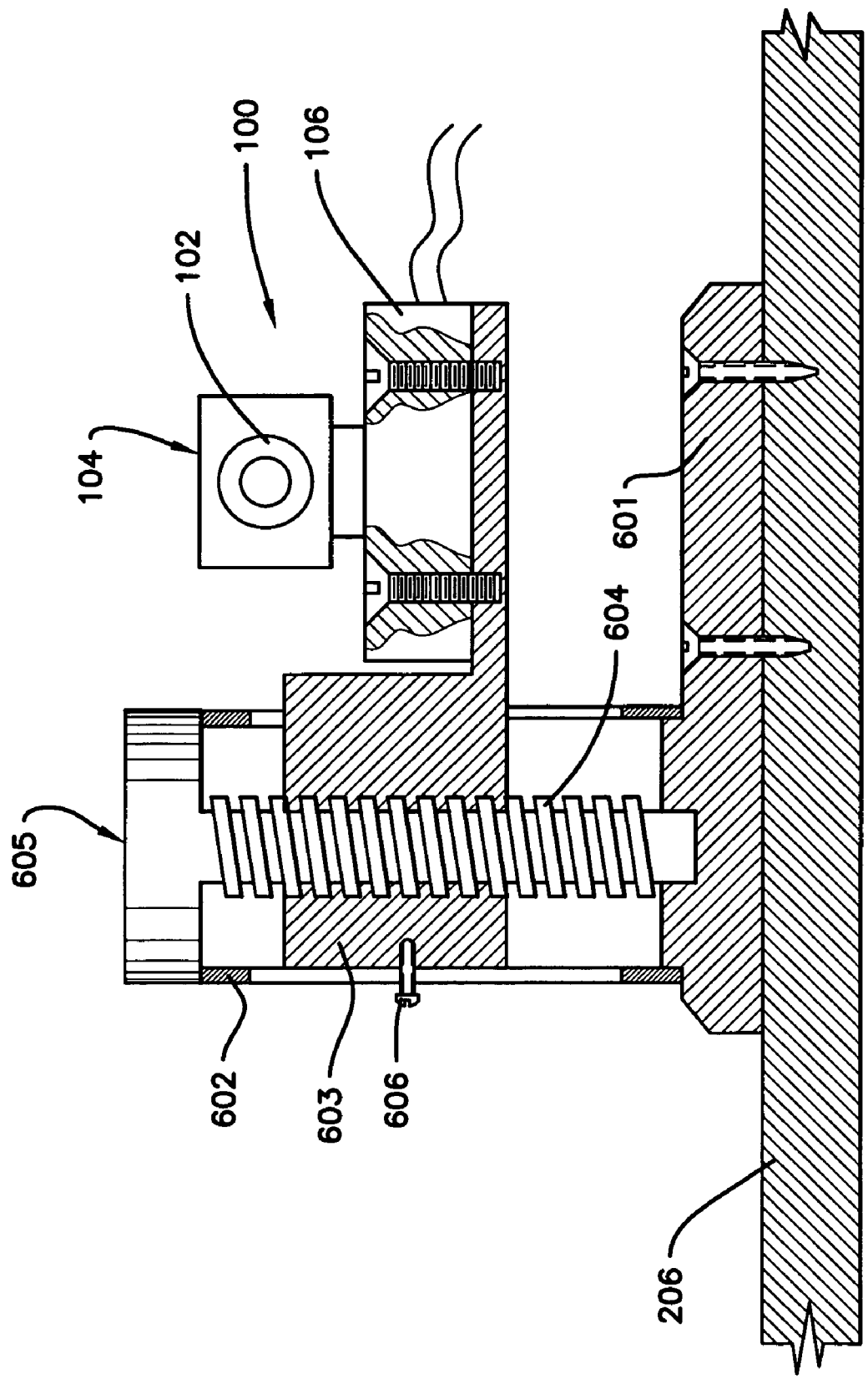
FIG. 16 is a sectional elevation view through another prior art means of mounting tone arm system (100) and adjusting the height of tone arm pedestal (106) above arm board (206). Base plate (601) is attached to arm board (206) by any of various ordinary means. Substantially tubular elevator column (602) is affixed to and extends vertically upward from base plate (601), receiving and guiding elevator platform (603), which is raised and lowered by elevator screw (604), which is received by threads in elevator platform (603) and is turned by elevator knob (605). Elevator platform (603) is locked in place by locking screw (606) after height adjustment. Tone arm pedestal (106) is mounted to elevator platform (603) by various ordinary means.

FIG. 13 is a detail elevation view from FIG. 1 with a cut-away showing a configuration of adjuster wheel (302), damping washer (306), and thrust bushing (307), said configuration minimizing the resulting height of tone arm pedestal (106) above arm board (206) when adjuster wheel (302) is turned to the position resulting in lowest height of tone arm pedestal (106) relative to arm board (206). The minimum overall height of adjuster wheel (302) is limited by the requirement to have at least one and preferably two or three full threads. In the configuration of FIG. 13, the outer portion of adjuster wheel (302) is made thinner than the inner portion, leaving an inner hub (330) thick enough to have at least one and preferably two or three full threads. Thrust bushing (307) is relieved by thrust bushing recess (331) to receive inner hub (330). Also, in this configuration, thrust bushing flange (316) may be set into a counterbore in arm board (206), to lower the position of thrust bushing (307) relative to arm board (206). If damping washer (306) is used, it may be located as shown in FIG. 13.

What is claimed is:

1. A tone arm mounting and vertical guide system comprising:

a. an adjuster screw (301) affixed to a tone arm pedestal (106) by an adjuster screw fastening means (305); an adjuster wheel (302) is adjustably received by adjuster wheel (302) receiving and adjusting means at the adjuster screw (301); the adjuster screw (301) is received into a thrust bushing (307) at an arm board (206); the thrust bushing (307) having a thrust bushing top face (308); the adjuster wheel (302) rotatably bearing against the thrust bushing top face (308), the thrust bushing (307) mounted in an arm board (206) with the bore of thrust bushing (307) perpendicular to the top plane of arm board (206); rotation of the adjuster wheel (302) adjusts the VTA (110);

b. a vertical guide system (370) in which a set of pedestal features (115) of tone arm pedestal (106), or any attachment thereto, are keyed to, and slidably received in the vertical direction, by a matching set of arm board features (208) of arm board (206), or any attachment thereto; said set of pedestal features (115), or set of arm board features (208), or both, of cylindrical topology (generated by vertical line elements).

2. A tone arm mounting and vertical guide system from claim 1 further comprising:
   a. the adjuster wheel (302) is rotatably received by threaded means at the adjuster screw (301); adjuster screw (301), having an adjuster screw axis of revolution (309), said adjuster screw (301) affixed to tone arm pedestal (106) so that a vertical axis through a tone arm system weight center of gravity (310) is as near or nearer the adjuster screw axis of revolution (309) as is the thrust bushing outer edge (311);
   b. vertical guide system (370) comprising: vertical guide elements (372) attached to vertical guide base plate (371), or to arm board (206), by vertical guide element attachment means (373), said vertical guide elements (372) receiving horizontal projection (107); said vertical guide base plate rotatably attached to arm board (206).

3. A vertical guide from claim 2 further comprising:
   a. the free play between vertical guide elements (372) and horizontal projection (107) is adjustable by free play adjusting means.

4. A vertical guide system (370) from claim 2 further comprising:
   a. a vertical guide base plate (371) is rotatably attached to an arm board with vertical guide base plate attachment and tension adjustment means (374).

5. A vertical guide system from claim 2 further comprising:
   a. a horizontal projection (107), attachable by a horizontal projection (107) attachment means to a tone arm pedestal (106) and received by a vertical guide system (370).

6. A tone arm mounting and vertical guide system from claim 1 further comprising:
   a. the adjuster screw (301), with or without adjuster screw external threads (312), and without adjuster wheel (302) is received by a thrust bushing (307), with a tone arm pedestal bottom (114) bearing on a thrust bushing top face (308).

7. A tone arm mounting system from claim 6 further comprising:
   a. a damping washer (306) received by an adjuster screw (301) and located between a tone arm pedestal bottom (114) and a thrust bushing top face (308).

8. A tone arm mounting system from claim 7 further comprising:
   a. a damping washer (306) has a raised rim (313) at its outer edge, said raised rim (313) receiving thrust bushing outer edge (311), thereby centering damping washer (306) on thrust bushing (307); said damping washer (306) having a damping washer hole (314) of larger diameter than the outside diameter of adjuster screw (301).

9. A tone arm mounting system from claim 1 further comprising:
   a. the adjuster wheel (302) is thin, with fine threads, and an outside diameter substantially larger than the width of the tone arm pedestal (106).

10. A tone arm mounting system from claim 1 further comprising:
    a. an outer part of adjuster wheel (302) is made thinner than an inner hub (330); inner hub (330) is thick enough to have one or more full threads, with thrust bushing top face (308) relieved by thrust bushing recess (331) to receive inner hub (330).

11. A vertical guide system from claim 1 further comprising:
    a. a vertical guide pin (375) is affixed to and extends vertically downward from horizontal projection (107), slidably received by a close fitting aperture (376) in an arm board (206) or in which a vertical guide pin (375) is affixed to and extends vertically upward from arm board (206), slidably received by a close fitting aperture (376) in horizontal projection (107).

12. A vertical guide system (370) from claim 1 further comprising:
    a. longitudinal external features, including but not limited to one or more slots (377) or one or more external flats (378) of an adjuster screw (301) keyed to corresponding longitudinal internal features, including but not limited to splines (379) or internal flats (380) internal to a thrust bushing (307).

13. A tone arm mounting system from claim 1 further comprising:
    a. a damping washer (306) is received by an adjuster screw (301) and located between a bottom of an adjuster wheel (302) and a thrust bushing top face (308).

14. A tone arm mounting system from claim 13 further comprising:
    a. a damping washer (306) has a raised rim (313) at its outer edge, said raised rim (313) receiving thrust bushing outer edge (311), thereby centering damping washer (306) on thrust bushing (307); said damping washer (306) having a damping washer hole (314) of larger diameter than the outside diameter of adjuster screw (301).

15. A tone arm mounting system from claim 1 further comprising:
    a. the thrust bushing flange (316) is set into a counterbore in arm board (206), to lower the position of thrust bushing (307) relative to arm board (206).

16. A tone arm mounting system of claim 1 further comprising:
    a. the adjuster wheel (302) is operated manually.

17. A tone arm mounting system of claim 1 further comprising:
    a. the adjuster wheel (302) is driven by adjuster wheel mechanical drive means (315).

18. A tone arm mounting system from claim 17 further comprising:
    a. the adjuster wheel mechanical drive means (315) and mechanical output means (412) include any mechanical drive system, including but not limited to one or more gears, one or more rollers, one or more belts, one or more drive chains, one or more actuators, one or more escapements, and/or one or more clutches.

19. A tone arm mounting system from claim 17 further comprising:
    a. the adjuster wheel mechanical drive means (315) are driven by mechanical output means (412) which are driven by reversible electric motor means (401) which is connected by power and control lead (411) to electrical power and control source (410).

20. A tone arm mounting system from claim 19 further comprising:
    a. a remote control transmitter (413) controls electrical power and control source (410) with control signals transmitted by transmission means (414).

* * * * *